United States Patent

[11] 3,630,020

[72] Inventors Thomas H. Chase
Houston, Tex.;
Robert M. Weigel, Seattle, Wash.
[21] Appl. No. 722,291
[22] Filed Apr. 18, 1968
[45] Patented Dec. 28, 1971
[73] Assignee The Boeing Company
Seattle, Wash.

[54] SOLAR ORIENTATION DEVICE
4 Claims, 8 Drawing Figs.
[52] U.S. Cl. ..................................... 60/23,
244/15.5, 310/4, 340/227
[51] Int. Cl. ..................................... F03g 7/06
[50] Field of Search ............................. 60/23;
244/15.5; 250/83.3 IR; 353/3

[56] References Cited
UNITED STATES PATENTS
R22,774  7/1946  Crise ........................... 60/23

| | | | |
|---|---|---|---|
| 534,871 | 2/1895 | French ........................... | 60/23 |
| 1,987,717 | 1/1935 | Smith ........................... | 60/23 X |
| 2,967,249 | 1/1961 | Quirk ........................... | 60/23 X |

Primary Examiner—Martin P. Schwadron
Assistant Examiner—Allen M. Ostrager
Attorneys—Glenn Orlob, Bernard A. Donahue and Kenneth W. Thomas ABSTRACT: A servomechanism apparatus which will continuously track a moving heat source through its plane of travel. A plurality of bimetallic elements are connected to a crank on an orientation shaft in a manner such that as the elements individually deform under radiant heating, they will actuate the crank and rotate the orientation shaft in a direction corresponding to the direction of movement of the moving heat source.

PATENTED DEC 28 1971
3,630,020
SHEET 1 OF 2
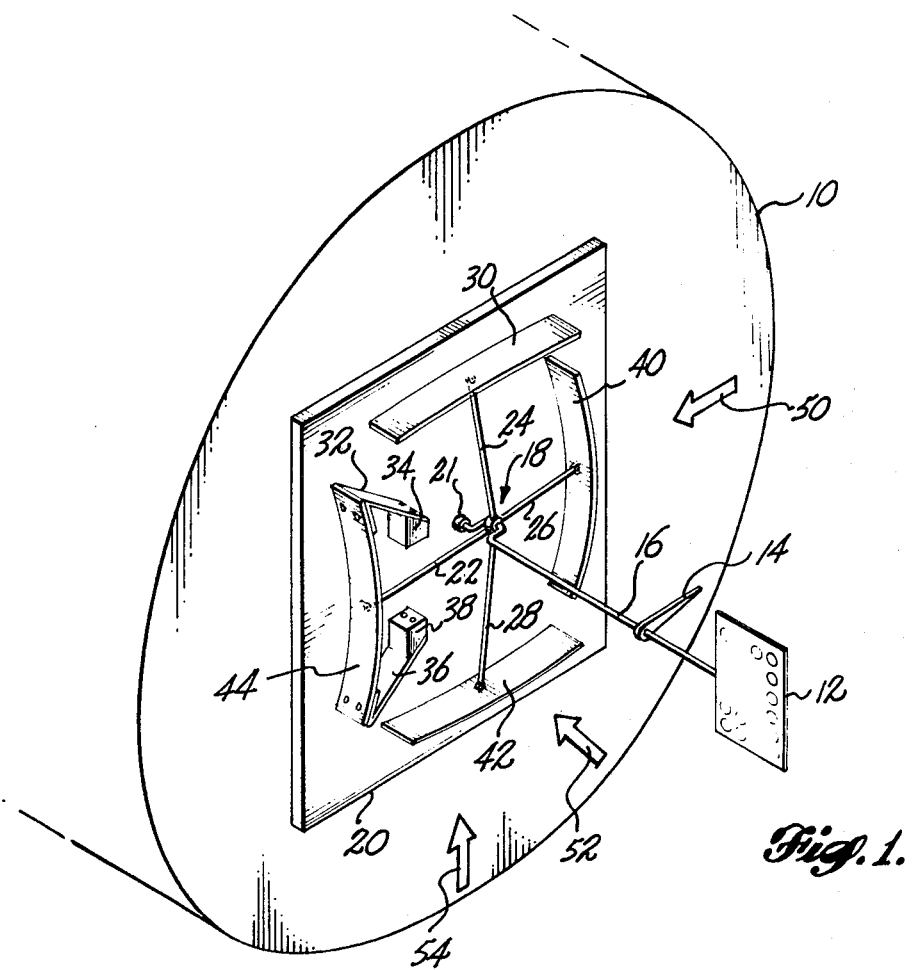
Fig. 1.
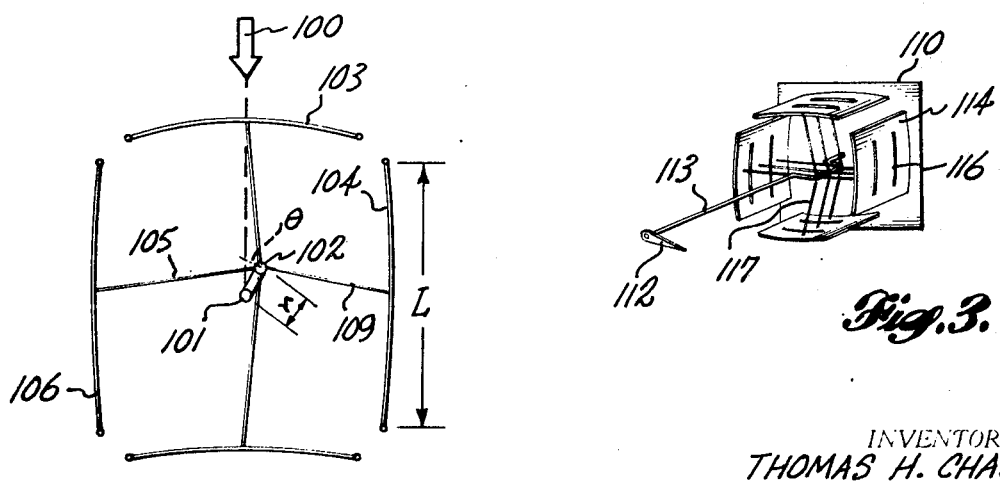
Fig. 2.
Fig. 3.
INVENTORS
THOMAS H. CHASE
ROBERT M. WEIGEL
BY
Bernard A. Donahue
ATTORNEY INVENTORS
THOMAS H. CHASE
ROBERT M. WEIGEL
BY
Bernard O'Donahue
ATTORNEY 3,630,020

1

SOLAR ORIENTATION DEVICE

BACKGROUND OF THE INVENTION

This invention relates to servomechanisms for tracking a heat source and is particularly well adapted to the task of continuously pointing a solar array or other instrument toward the sun although the disclosed system and its elements are not limited to such use.

Many space exploration missions involve simultaneous requirements for pointing one instrument at some point in space and another instrument or solar array at the sun. Examples of such missions are those performed by the Nimbus, Lunar Orbiter, Surveyor, and Voyager programs. In the past this usually has been done by pointing one vehicle axis at the point of interest and articulating the instrument, or solar array, toward the sun by means of a closed-loop servosystem involving a sun sensor, a power amplifier, and a sealed electric motor with a gear train to drive the orientation shaft in a manner to reduce the error sensed by the sun sensor. Such systems have been used with a fair degree of success; however, these designs suffer several undesirable limitations. For example, power requirements are high, reliability is lower than desired, and environmental protective features are cumbersome and heavy.

The new and unique solar orientation device to be described here is completely self-contained. It requires no external power source, amplification, or environmental protection. The sensing, processing, and torque functions are all implicit in the geometry, materials, and radiant heat environment. Self-contained orientation devices have been proposed in the past; however, none of these devices appear to be capable of continuously tracking a heat source with the desired accuracy through an unlimited number of complete rotations with unrestricted movement. Prior art configurations have been proposed which utilize bimetallic elements. However, the performance of these devices has usually been compromised by one or more of the following factors; movement which is restricted to ±90° from a null position; an error factor which increases with the distance from the null position; or symmetry which can cause the system to track at 180° out of phase.

SUMMARY OF THE INVENTION

The general purpose of this invention is to provide a system which will maintain a desired orientation with respect to a moving heat source. The present invention utilizes a plurality of bimetallic beam elements which deform under radiant heating and actuate a crankshaft in a manner such that the system will track the heat source.

This invention is based upon the fact that a bimetallic element of the type used in a thermostat will bend one way when heated and the other way when cooled. It will be shown that it is possible to devise an arrangement of bimetallic beam elements which will cause a shaft to rotate toward a direction of incident heat radiation.

Accordingly, it is an object of this invention to provide a heat-responsive tracking servomechanism which is completely self-contained, i.e., which does not require an external power source, which does not require an additional motor, and which does not require a gear train for actuation.

Another object of the instant invention is to provide a self-contained heat-responsive tracking servomechanism which is more accurate than prior devices and which has an unrestricted freedom to respond in the correct direction, irrespective of its instant orientation.

Other and further objects of this invention will become apparent from the detailed description given in connection with the various figures of the drawings.

BRIEF DESCRIPTION OF THE DRAWINGS

FIG. 1 is a schematic representation of one of the preferred embodiments, with the orientation device depicted as aiming a solar array 12 in the direction of a heat source.

FIG. 2 is a schematic plan view which illustrates certain geometric parameters.

FIGS. 3, 4, and 5 each depict alternative embodiments which show various optional arrangements of the bimetallic strips with respect to the central output shaft.

DESCRIPTION OF THE PREFERRED EMBODIMENTS

Figure 4:
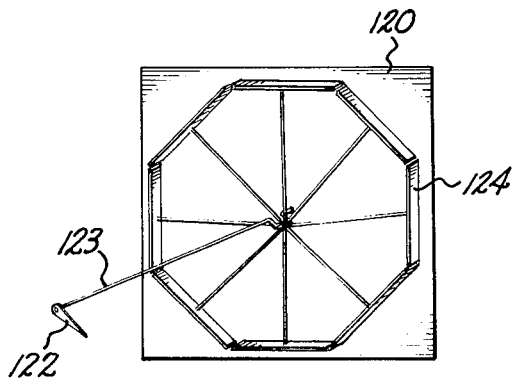

FIG. 1 shows a solar orientation device, mounted on a body 10, which has oriented an equipment item 12 in the direction indicated by the pointer 14. An orientation shaft 16 includes a crank portion 18 which is rotatably mounted on base member 20 by bearing means 21. Connecting links 22, 24, 26, and 28 are rotatably connected to crank portion 18 at their inner ends and to the center of the bimetallic beam elements 44, 30, 40, and 42 respectively, at their outer ends. The bimetallic beam elements in this embodiment have an initial curvature outwardly at their centers and they are supported at each end in the manner of a simple beam. To avoid unnecessary detail in the drawing, only the support for the beam element 44 has been shown. Beam element 44 is depicted as being supported at its ends by cantilevered thin flexible strips 32 and 36 which are rigidly affixed to base blocks 34 and 38. Flexible strips were selected in this embodiment as a means of obtaining a relatively restraint-free end support for the beam element, allowing both lateral and rotational movement of each end.

As is well known to those skilled in this art, a bimetallic element comprises two strips of thermally dissimilar metals which are bonded or attached together so that they will function as a single mechanical unit. The metals are selected based upon their individual thermal coefficients of expansion and the magnitude of the desired deflection. A bimetallic element will deform in a predictable manner in response to a change in temperature, since one of the strips will expand or contract at a greater rate than the other strip and this causes a change in the curvature of the element.

In the construction of a bimetallic beam element, it is preferable to select metals having widely different expansion coefficients, e.g., steel and invar, so that the beam will assume relatively large changes in its curvature for relatively small temperature changes. In the discussion which follows, it will be assumed that the metal strip having the greatest thermal coefficient of expansion has been located on the outer side of the beam. An increased deflection response of the elements can often be obtained by so arranging the strips, since the heat-conducting properties of the materials can create a relatively large thermal gradient across the element itself. With the outer strip having the greatest thermal coefficient of expansion, an increase in temperature will cause a simple beam element to deflect outwardly, whereas a similar increase in temperature will cause a cantilevered beam element to deflect inwardly.

The lengths of the connecting links 22, 24, 26, and 28 are preferably set so that the curved simple beams of FIG. 1 remain flexed nominally outwardly in their normal or unheated position.

It should be understood that the connecting links can comprise either rodlike members capable of carrying compression loadings or wirelike members which are pretensioned such that they will not go slack into operating environment. As will readily be seen from FIG. 1, when a heat source radiates from direction 50, the bimetallic beam 40 bends outwardly at its center, away from the shaft 16, and the link 26 pulls the crankshaft 18 toward the heat source, thus orienting equipment item 12 in the proper direction, as indicated by the pointer 14. The other three beams remain cool in this environment since they are not directly exposed to radiation from the heat source.

When the heat source is placed at a position indicated by arrow 52, it is apparent that both beams 40 and 42 will react to the incident radiant heating by bending outwardly an equal amount, thereby pulling the crankshaft and the equipment item 12 into a direction facing toward heat source 52.

It follows that when the heat source is moved to a position indicated by arrow 54, the beam 40 will return to a cool state, and the beam 42 will become hotter and take on a larger deflection, thereby causing the equipment item 12 and pointer 14 to seek a position facing direction 54. It is evident that the system will cause the pointer 14 to rotate until it points directly at the heat source, irrespective of the location of the heat source within its plane of travel.

FIG. 2 illustrates the system parameters which are required to compute the amount of restoring torque available when the system is disturbed from an equilibrium position. FIG. 2 schematically depicts a condition wherein the radiant heat energy is coming from a direction 100, and the bimetallic beam 103 is therefore deflected outwardly. It is assumed that an external disturbance has caused the system to accumulate an instantaneous error angle theta. The restoring moment is provided by the two side beams 104 and 106, and can be estimated by the expression $M=2Fr$ where $F$ equals the force within the connecting links 105 and 109 and $r$ equals the length of the crank between orientation shaft 101 and connecting link attach point 102. As will be understood by those skilled in the art, bimetallic simple beam formulas such as those set forth in Handbook of Engineering Fundamentals by Miner and Seastone, Wiley and Son, New York, N.Y., can be used to compute the parameter F, and other force-deflection data, for the purpose of obtaining a desired spring rate for restoration purposes.

FIG. 3 depicts an optional configuration in which a high-restoring torque spring rate can be obtained. The width of the bimetallic beam 114 has been increased for the purpose of obtaining increased stiffness. Because of the increased width, stress relief slots 116 are utilized to confine the thermal bending to one axis. In the embodiment shown in FIG. 3, two stress relief slots 116, and three connecting links 117 are utilized for each bimetallic beam 114.

The FIG. 4 embodiment 120 shows an arrangement of eight bimetallic beams 124 arranged around an orienting shaft 123. This embodiment functions in a manner similar to the embodiments previously described, the larger number of elements giving an increased accuracy and a higher restoring torque to the system.

Figure 5:
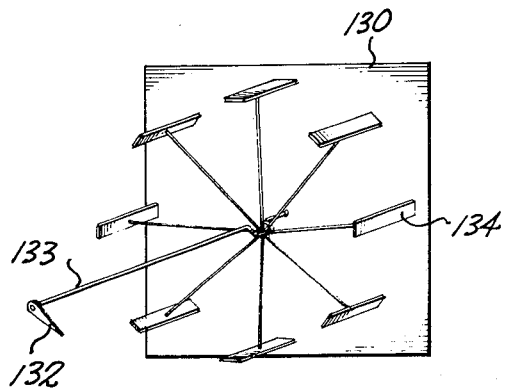

FIG. 5 discloses an embodiment 130 in which beam elements 134 are arrayed such that their longitudinal axes are aligned in the same direction as the longitudinal axis of orienting shaft 133. This embodiment minimizes the space limitation problems inherent in multiple-element systems. The beam elements are preferably restrained at each end in the manner described in connection with FIG. 1.

Figure 6:
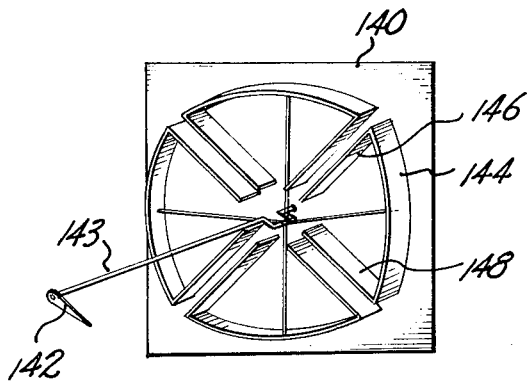
FIG. 6 shows an alternative array of bimetallic strips in which the strips are flexibly mounted for increased sensitivity.

FIG. 6 discloses an alternative embodiment 140 in which flexible bimetallic supports 146 and 148 are formed by bending the end portions of bimetallic beam elements 144. In this embodiment increased sensitivity is obtained by means of increased deflection response of the curved beam 144 since as the center of the beams deflect outwardly under heating, the ends of the curved portions move inwardly by virtue of the lateral thermal deflection of the bimetallic support members 146 and 148.

Figure 7:
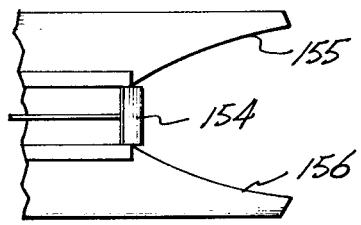
FIG. 7 illustrates a reflective means which may be used for concentrating radiant energy upon an individual bimetallic strip.

FIG. 7 illustrates a means of obtaining an increase in the heat flux impinging on an individual bimetallic beam element. Suitable reflective surfaces 155 and 156 are positioned to reflect radiant heat energy onto beam element 154 thereby increasing beam temperatures and deflections and therefore increasing the torque capability of the system.

Figure 8:
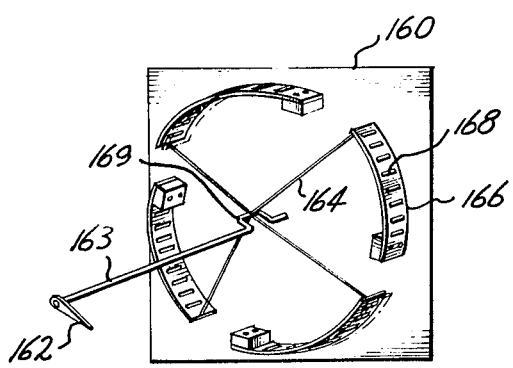
FIG. 8 is a showing of a preferred cantilever array in which pretensioned wire connecting means and transverse beam corrugations are illustrated.

FIG. 8 provides a showing of a preferred cantilevered array in which pretensioned wire or cord links, as at 164, are used as the means operably connecting the bimetallic elements 166 with the crank portion 164. While such wire or cord connecting means are not capable of carrying compression loads, the wire or cord may be pretensioned upon initial assembly by bending the element 166 inwardly before attaching links 164 such that the torquing forces are provided by differential tension. The initial tension in the members is preferably set such that the wires will not go slack under maximum conditions in the operating environment. It will be noted that the throw of crank 169 is opposite the heat source because in this embodiment, the heated element will relax thereby causing the opposite element to pull the crank in the opposite direction.

FIG. 8 also provides a showing of an additional optional feature wherein the bimetallic beam elements have been corrugated, as at 168, in order to reduce lateral deformation of the beam element across its width. Experimental data indicate a greatly enhanced efficiency when such corrugations are used.

It will be apparent to persons skilled in this art that a three-dimensional tracking system may be assembled by mechanically joining three of the single plane units constructed according to the teachings of this disclosure. Also, while all of the illustrated embodiments have included at least four bimetallic elements, it is apparent that a two or three element system will provide at least a gross approximation of the performance of the preferred embodiments. While several embodiments of the instant invention have been shown and described, it will be obvious to those skilled in the art that changes and modifications can be made without departing from the spirit and scope of the invention.

What is claimed is:

1. A servomechanism for orienting an item of equipment with respect to a moving heat source comprising:
   a base member,
   at least three bimetallic beams restrained by support means mounted on said base member,
   crank means rotatably mounted with respect to said base member,
   means operably connecting said crank means and said
      bimetallic elements comprising at least three connecting links rotatably attached to said crank means,
   wherein said bimetallic beams are arrayed in a manner such that radiant heating from said heat source will cause said bimetallic beams to deform and thereby initiate movement of said item of equipment to cause it to track said moving heat source.

2. The servomechanism of claim 1 wherein said support means comprise thin flexible strips which will allow the beam ends to deform laterally and rotationally when said beams are subjected to said radiant heating.

3. The servomechanism of claim 2 wherein said thin flexible strips comprise bimetallic elements which deform when subjected to a temperature change.

4. The servomechanism of claim 1 wherein said bimetallic beams each comprise a plurality of transversely oriented corrugations, and said connecting links comprise pretensioned wirelike means.

* * * * *